(12) United States Patent
Johnson et al.

(10) Patent No.: US 12,246,367 B2
(45) Date of Patent: Mar. 11, 2025

(54) EXTRUSION COMPONENT HAVING LUBRICIOUS COATING AND METHOD OF EXTRUDING ABRASIVE MATERIAL

(71) Applicant: CORNING INCORPORATED, Corning, NY (US)

(72) Inventors: Benedict Yorke Johnson, Horseheads, NY (US); Angela Marie Vaughn, Corning, NY (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 17/718,605

(22) Filed: Apr. 12, 2022

(65) Prior Publication Data
US 2022/0331851 A1 Oct. 20, 2022

Related U.S. Application Data

(60) Provisional application No. 63/175,821, filed on Apr. 16, 2021.

(51) Int. Cl.
*B21C 23/32* (2006.01)
*B05D 5/08* (2006.01)
(Continued)

(52) U.S. Cl.
CPC ............. *B21C 23/32* (2013.01); *B05D 5/086* (2013.01); *B21C 23/24* (2013.01); *C09D 5/00* (2013.01);
(Continued)

(58) Field of Classification Search
CPC . C08K 3/30; C08K 3/36; C08K 3/013; C08K 2003/3009; B21C 23/32;
(Continued)

(56) References Cited

U.S. PATENT DOCUMENTS 8,333,878 B2 12/2012 Seradarian et al.
10,330,878 B2 * 6/2019 Chawda ............... G02B 6/4479
(Continued)

FOREIGN PATENT DOCUMENTS

CN 107858060 A 3/2018
EP 2424946 B1 4/2016

OTHER PUBLICATIONS

Khedkar et al., "Sliding wear behavior of PTFE composites", Wear, vol. 252, Issue 5-6 (2002), pp. 361-369.
(Continued)

*Primary Examiner* — Vishal V Vasisth
(74) *Attorney, Agent, or Firm* — Kevin M. Able

(57) ABSTRACT

A method of increasing the lubricity of an extrusion component, the method comprising: functionalizing a surface of a wall of an extrusion body with PDA material to form a PDA treated surface; coating the PDA treated surface with a lubricious material; and heat treating the wall of the extrusion body for a time and a temperature sufficient to cause the lubricious material to adhere to the PDA material, and for the PDA material to adhere to the wall; wherein the surface of the wall is optionally oxidized prior to the functionalizing. Also an extrusion component comprising: an extrusion body comprising an inlet face and an outlet face, the body comprising a base structure comprising an internal wall defining at least a portion of an extrusion pathway from the inlet face to the outlet face, wherein at least part of the internal wall comprises a lubricious coating that defines at least part of the extrusion pathway.

22 Claims, 4 Drawing Sheets

(51) Int. Cl.
*B21C 23/24* (2006.01)
*C09D 5/00* (2006.01)
*C09D 7/40* (2018.01)
*C09D 7/61* (2018.01)
*C09D 127/18* (2006.01)

(52) U.S. Cl.
CPC ............... *C09D 7/61* (2018.01); *C09D 7/66* (2018.01); *C09D 127/18* (2013.01)

(58) Field of Classification Search
CPC .. B21C 23/24; C09D 7/65; C09D 7/66; C09D 5/00; C09D 7/61; C09D 127/18
See application file for complete search history.

(56) References Cited

U.S. PATENT DOCUMENTS

| | | |
|---|---|---|
| 2012/0103183 A1 | 5/2012 | Jung et al. |
| 2013/0062819 A1* | 3/2013 | Eisenstock ............ B29C 48/355 425/461 |
| 2016/0348025 A1 | 12/2016 | Ou |
| 2017/0298286 A1* | 10/2017 | Nowak .............. C08G 18/5015 |
| 2018/0223835 A1 | 8/2018 | Maki et al. |

OTHER PUBLICATIONS

Shi et al., "A robust superhydrophobic PPS-PTFE/SiO2 composite coating on AZ31 Mg alloy with excellent wear and corrosion resistance properties", Journal of Alloys and Compounds, vol. 721 (2017), pp. 157-163.

* cited by examiner

EXTRUSION COMPONENT HAVING LUBRICIOUS COATING AND METHOD OF EXTRUDING ABRASIVE MATERIAL

This application claims the benefit of priority under 35 U.S.C. § 120 of U.S. Provisional Application Ser. No. 63/175,821 filed on Apr. 16, 2021, the content of which is relied upon and incorporated herein by reference in its entirety.

TECHNICAL FIELD

Embodiments of the present disclosure generally relate to methods and apparatus for extruding abrasive material with an extrusion component having a lubricious coating.

BACKGROUND

Due to the highly abrasive nature of material mixtures such as ceramic-forming, or ceramic, mixtures or batches, which can have the consistency of a paste, extrusion of the pastes causes mechanical wear of extrusion components such as dies, even if provided with a hard coating. The coating degrades during the extrusion process and dies eventually become unusable for example after several production cycles. The coating may need to be replaced frequently such as when tight dimensional accuracy of the extrudates is to be maintained. To reuse an expensive die, the coating may be entirely removed and recoated, for example by a chemical process that can be tedious (such as many process steps), time-consuming (e.g. low stripping rates), expensive and/or labor intensive, and may require the use of highly reactive chemicals. Even with recoating, high die pressure may be experienced particularly for ultrathin and/or high cell density dies, and the initial high die pressure could cause over pressure conditions and/or pressure instabilities that cause the extruder to shut down.

Accordingly, there is a need for alternative methods and apparatus to extrude abrasive material.

SUMMARY

In one aspect, an extrusion component is disclosed herein comprising an extrusion body comprising an inlet face and an outlet face, the body comprising a base structure comprising an internal wall defining at least a portion of an extrusion pathway from the inlet face to the outlet face, wherein at least part of the internal wall comprises a lubricious coating that defines at least part of the extrusion pathway.

In some embodiments, the lubricious coating has a surface facing the extrusion pathway with an average coefficient of friction of about 0.10 or less, in some embodiments about 0.08 or less, and in some embodiments about 0.05 or less.

In some embodiments, the lubricious coating has a surface facing the extrusion pathway with an average coefficient of friction of about 0.05 to 0.20 for V/NS of 0.0002 to 2 (inch/s)/psi as measured using a shear rotational rheometer, and in some embodiments less than about 0.30 for V/NS of 0.0001 to 10 (inch/s)/psi as measured using a shear rotational rheometer.

In some embodiments, the lubricious coating has a surface facing the extrusion pathway with an average water contact angle of about 130° or more, and in some embodiments about 130° to 179°.

In some embodiments, the lubricious coating has a surface facing the extrusion pathway with an average oil contact angle of about 5° or less, and in some embodiments about 0.01° to 5°.

In some embodiments, the lubricious coating is hydrophobic. In some embodiments, the lubricious coating is oleophilic.

In some embodiments, the lubricious coating is hydrophobic and oleophilic.

In some embodiments, the lubricious coating has a hydrophobic surface facing the extrusion pathway.

In some embodiments, the lubricious coating has an oleophilic surface facing the extrusion pathway.

In some embodiments, the lubricious coating has a hydrophobic and oleophilic surface facing the extrusion pathway.

In some embodiments, the lubricious coating comprises a fluoropolymer.

In some embodiments, the lubricious coating comprises a fluoropolymer of tetrafluoroethylene.

In some embodiments, the lubricious coating comprises polytetrafluoroethylene (PTFE).

In some embodiments, the lubricious coating consists essentially of PTFE.

In some of these embodiments, the lubricious coating comprises inorganic nanoparticles.

In some embodiments, the inorganic nanoparticles are present in the lubricious coating in an amount of 0.1 wt % to 10 wt % relative to the amount of fluoropolymer.

In some embodiments, the inorganic nanoparticles are present in the lubricious coating in an amount of 0.1 wt % to 7 wt % relative to the amount of fluoropolymer.

In some embodiments, the inorganic nanoparticles are present in the lubricious coating in an amount of 1.0 wt % to 6 wt % relative to the amount of fluoropolymer.

In some embodiments, the inorganic nanoparticles are present in the lubricious coating in an amount of 3.0 wt % to 10.0 wt % relative to the amount of fluoropolymer.

In some embodiments, the lubricious coating comprises inorganic sulfide nanoparticles.

In some embodiments, the lubricious coating comprises inorganic carbon nanoparticles.

In some embodiments, the lubricious coating comprises silica nanoparticles. In some embodiments, the lubricious coating comprises inorganic silica compound nanoparticles.

In some embodiments, the lubricious coating comprises nanoparticles selected from the group consisting of $MoS_2$, graphite, graphene, $WS_2$, silica, and combinations thereof.

In some embodiments, the lubricious coating comprises $WS_2$ nanoparticles and silica nanoparticles.

In some embodiments, the lubricious coating comprises one or more inorganic compounds selected from the group consisting of sulfides, inorganic carbon compounds, and combinations thereof.

In some embodiments, the lubricious coating comprised PTFE and nanoparticles of $WS_2$ and silica which are present in the lubricious coating respectively at 2.0 wt % and 3.3 wt % relative to the amount of PTFE.

In some embodiments, the base structure is comprised of a metal.

In some embodiments, the base structure is comprised of a stainless steel.

In some embodiments, the base structure is comprised of a 422 stainless steel.

In some embodiments, the internal wall comprises an abrasion resistant layer disposed beneath the lubricious coating.

In some embodiments, the internal wall comprises an abrasion resistant layer disposed between the base structure and the lubricious coating.

In some embodiments, the abrasion resistant layer is comprised of one or more compounds selected from the group of iron boride, chromium carbide, aluminum oxide, titanium carbide, titanium nitride, titanium carbonitride (TiCN) and boron doped titanium carbonitride (B—TiCN).

In some embodiments, the abrasion resistant layer is comprised of TiCN, B—TiCN, or a combination thereof.

In some embodiments, the internal wall further comprises an adhesive material disposed between the abrasion resistant layer and the lubricious coating.

In some embodiments, the adhesive material comprises PDA.

In another aspect, a method is disclosed herein of increasing the lubricity of an extrusion component for an extrusion apparatus, the method comprising: functionalizing a surface of a wall of an extrusion body of the extrusion component with PDA material to form a PDA treated surface; coating the PDA treated surface with a lubricious material; and heat treating the wall of the extrusion body for a time and a temperature sufficient to cause the lubricious material to adhere to the PDA material, and for the PDA material to adhere to the wall. The surface of the wall is optionally oxidized prior to the functionalizing.

In some embodiments, the surface of the wall comprises an abrasion resistant material.

In some of these embodiments, the abrasion resistant material is TiCN or B—TiCN.

In some of these embodiments, the surface of the wall is ultrasonically cleaned prior to the functionalizing.

In some of these embodiments, the surface of the wall is functionalized with PDA material via liquid phase deposition.

In some embodiments, the extrusion body with PDA is dipped in a lubricious material solution.

In some embodiments, the extrusion body with PDA is dipped in a lubricious material solution, then dried, and then heated.

In some embodiments, the part of the extrusion body with lubricious material is dried at 100-150 C for 2-30 minutes.

In some embodiments, after drying, the part of the extrusion body with lubricious material is heated at 200-400 C for 5-30 minutes.

In some embodiments, the portion of the wall with PDA is dipped in a lubricious material solution, then dried at 120-150 C for 5-15 minutes, then heated at 250-300 C for 10-20 minutes.

In some embodiments, the lubricious material is hydrophobic and oleophilic.

In some embodiments, the matrix is intermixed with a slip additive.

In some embodiments, the base structure comprises a plurality of internal walls defining a plurality of extrusion pathways.

In some embodiments, the extrusion component is an extrusion die.

In some embodiments, the extrusion component is a honeycomb extrusion die.

In some embodiments, the extrusion component is an extruder barrel.

In some embodiments, the extrusion component is a flow straightener.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
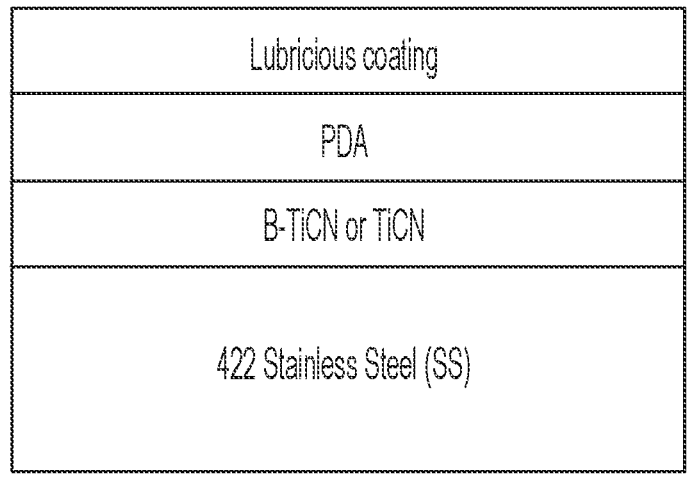
FIG. 1 is a schematic representation of a lubricious coating on B—TiCN or TiCN coating on an extrusion component body, or "substrate", of 422 stainless steel.

Before describing several exemplary embodiments of the disclosure, it is to be understood that the disclosure is not limited to the details of construction or process steps set forth in the following description. The disclosure is capable of other embodiments and of being practiced or being carried out in various ways. As used herein, "extrusion component" or "extrusion apparatus component" refers to a component of an extrusion apparatus, said component comprising an extrusion body at least part of which comprises one or more surfaces suitable for conveying and/or working and/or being in contact with extrudable material such as abrasive material such as ceramic and/or ceramic-forming batch material.

Extrusion dies for use with abrasive materials or mixtures, such as ceramic forming mixtures, can be coated with titanium carbonitride (TiCN)-based wear resistant coatings, in some embodiments via chemical vapor deposition (CVD), to (1) help extend the useful-life of the extrusion die, and (2) provide a die extrusion surface which is in accordance with the final operating dimensions of the die such as in terms of slot width and feed hole diameter.

An extrusion die for processing ceramic forming paste mixtures can undergo high die pressure especially when indexing new or freshly recoated dies, including high cell density, ultrathin slot dies such as for making substrates or heavy duty substrates for catalytic converters or particulate filters. The initial high die pressure can cause an extruder such as a twin screw machine extruder (TSM) to reach an over pressure condition and shut down. The feed rate of the paste mixture into the die may then need to be reduced to manage the system and die pressure to within an acceptable range. A high start-up pressure, which may be referred to as a pressure spike, might take up to several hours to resolve or decay to a steady value. As the extrusion process becomes stable, the feed rate can be incrementally increased until the full feed rate is achieved. However, the incremental increasing of feed rate in some instances can take several hours. During this period, the quality of the ware being produced might be compromised due to process pressure instabilities. If these pressure instabilities can be eliminated or dramatically reduced during introduction of a new or freshly recoated die a significant amount of expense in time and materials used on the line can be avoided.

Due to the highly abrasive nature of the ceramic forming batch mixtures, extrusion of the pastes causes mechanical wear of the hard coating. Hence, the coating degrades during the extrusion process and the dies may become unusable, even after several production cycles. Thus, the coating needs to be replaced frequently if the dimensional accuracy of the extrudates is to be maintained. The expensive die can be reused if the coating is removed, such as by a chemical process to remove the TiCN coating, and the die recoated.

In the embodiments herein, a process is disclosed for forming a durable lubricious coating that imparts excellent lubricity and wear resistance to extrusion surfaces like an extrusion die surface. The lubricious coating has one or more, preferably two or more, and even more preferably all three of (1) high lubricity, (2) high hydrophobicity, and (3) high oleophilicity; preferably the lubricious coating has an average coefficient of friction (CoF) of about 0.10 or less; preferably the lubricious coating has an average water contact angle of about 130 degrees or more; preferably the lubricious coating has high oleophilicity, such as an average contact angle of 0+/−1 degrees for a synthetic oil such as durasyn oil.

In embodiments disclosed herein, extrusion surfaces comprised of the lubricious coating which are both hydrophobic and oleophilic are expected to facilitate oil enrichment at the interface between the ceramic forming batch mixture and the die which it is believed without needing to rely on this belief that the lubricious coating will then accelerate the formation of a slip layer, which it is believed may in turn lower the walldrag and help the extrusion pressure to quickly reach a steady state which may help to increase the quality of the extruded material and structures. Thus reducing wear on the hard coatings will reduce the frequency of chemical process stripping of the worn-out hard coatings.

In the embodiments disclosed herein, a lubricious coating is present at the surface of an extrusion component such as an extrusion die, wherein the lubricious coating is disposed on an abrasion resistant coating comprised of, and in some embodiments consisting essentially of, TiCN and/or B—TiCN, wherein the abrasion resistant coating is disposed on the surface of an extrusion component body. Preferably the extrusion component body is comprised of, and in some embodiments consisting essentially of stainless steel. In some preferred embodiments, the stainless steel is 422 stainless steel. The extrusion component having an extrusion surface comprised of the lubricious coating preferably reduces or minimizes friction between extrusion batch material and the extrusion component wall such as an extrusion die wall.

In some embodiments disclosed herein, the lubricious coating is comprised of a lubricious matrix intermixed with slip additives such as layered 2D materials including molybdenum disulfide (MoS2), graphene/graphite and tungsten disulfide (WS2). The lubricious coating is adhered to the surface of a TiCN based coating using polydopamine (PDA) as a tie or adhesive layer.

In some embodiments, method is disclosed herein of applying the lubricious coating onto a abrasion resistant coated steel substrate such as B—TiCN or TiCN coated 422 SS substrate, comprising: (i) optionally oxidizing or slightly oxidizing the surface of the TiCN-based coating for improved adhesion; (ii) functionalizing the surface with PDA molecules to form a tie or adhesive layer and (iii) coating the PDA treated surface with a lubricious matrix intermixed with a slip additive.

In some preferred embodiments disclosed herein, the surface of the lubricious coating is hydrophobic and oleophilic, particularly for extrusion mixtures which contain one or more oils (like oil-containing batches), wherein the lubricious coating is helpful in facilitating migration of oil to the component-mixture interface such as a die-batch interface, which will in turn enhance the slippage at the interface. The slip promoting ability of the coating can enable reduction in the amount of oil added to oil-containing batches which could reduce and in some cases eliminate the occurrence of oil induced fissures.

FIG. 1 is a schematic representation of set of embodiments disclosed herein comprising a lubricious coating on B—TiCN or TiCN coating on an extrusion component body, or "substrate", of 422 stainless steel. In various embodiments, the lubricious coating is adapted to impart a high degree of lubricity to the surface of TiCN-based coatings on stainless steel substrates; in some of these embodiments the lubricious coating is comprised of a lubricious matrix intermixed with slip additives such as layered 2D materials.

Figure 2:
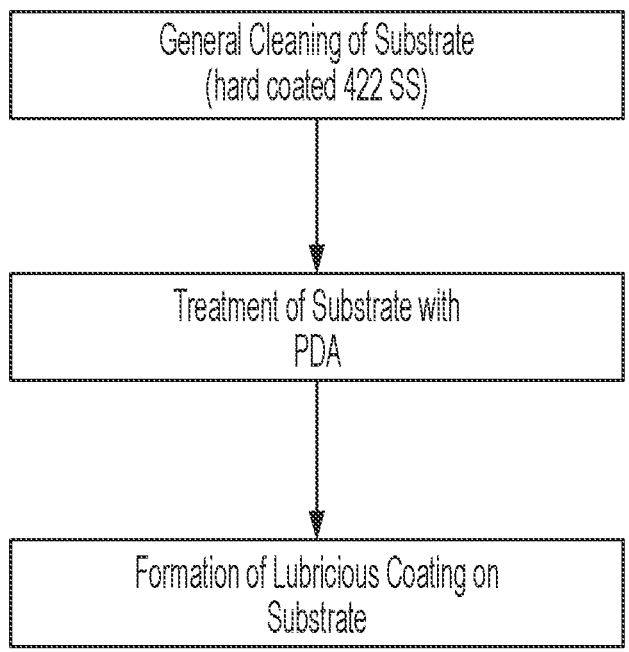
FIG. 2 is a flow diagram of processing steps disclosed herein for forming a lubricious coating on a substrate, such as the B—TiCN or TiCN coated 422 SS body of FIG. 1.

FIG. 2 is a flow diagram of processing steps disclosed herein for forming a lubricious coating on a substrate, such as the B—TiCN or TiCN coated 422 SS body of FIG. 1. In one set of embodiments disclosed herein, process or method for forming the lubricious coating comprises (i) ultrasonically cleaning the substrate, such as ultrasonically cleaning a TiCN or B—TiCN-coated substrate in acetone followed by ultrasonic rinse in IPA; (ii) functionalizing the surface of the clean substrate, such as functionalizing with PDA molecules via liquid phase deposition; and (iii) applying the lubricious coating such as by dipping the PDA coated substrate into the lubricious coating solution, drying at 135° C. for 10 minutes, heating at 270° C. for 15 minutes to remove the surfactants used in dispersing PTFE particles, and iv) annealing the lubricious coating such as by heating or annealing at 350° C. to melt the PTFE to form a uniform adherent coating.

The durability of the lubricious coating was evaluated using steel wool abrasion test which evaluates the durability of the lubricious coating under reciprocating sliding conditions. The sliding speed and the applied load were 60 m/min and 1 kilogram, respectively. The number of cycles to failure (i.e. the number of cycles to wear through the thickness of the lubricious coating) defines the durability of the lubricant. Absence of any lubricious coating on the hard-coated surface results in a heavy abrasion sound in a very short cycle time. The static coefficient of friction (COF) of the lubricious coating, a measure of the lubricity of the coating, was measured and compared to that of as-received TiCN coated coupons. The following parameters were used: counter material-granite, sliding distance—25 mm, applied load—3000 g, and sliding speed—10 mm/min. The effect of the lubricious coating on die pressure was evaluated using mini-slit die and small-scale 3.5" 400/4 dies which could present start up challenges during high pressure extrusion of highly abrasive material.

EXAMPLES

Examples 1-3

Lubricious Coatings Applied to TiCN Coated 422 SS Coupons

In Examples 1-3 below, PTFE coatings intermixed with nanoparticles of 2D layered materials as slip additives, were applied to TICN coated 422 stainless steel (SS) coupons and evaluated for their lubricity. The 2D materials evaluated were $MoS_2$, graphite and $WS_2$. The substrate used was TiCN coated 422 SS coupon. The lubricious coatings were formed on the coupon as follows: First, the as-received coupon was cleaned with acetone in an ultrasonic bath for 10 minutes. It was then soaked in isopropyl alcohol in an ultrasonic bath for 10 minutes and rinsed in deionized water. Subsequently, the coupon was dried at 110 C for 30 minutes. Next step, was treating the coupons with PDA by dipping the coupon in PDA solution for 4 hours. The coupon was subsequently rinsed in deionized (DI) water and dried in a convection oven in air at 130° C. for 30 minutes. In the next step, the lubricious coating comprised of PTFE intermixed with 2.0 wt. % of the respective slip additive was applied to the PDA treated surface by dipping in the aqueous coating solution at 30 wt %) solid loading for 30 seconds followed by drying in a convection oven in air at 135° C. C for 10 minutes. After drying, the PTFE coated coupon was heated at 270° C. for 10 minutes to remove the surfactants used for PTFE dispersion. Finally, PTFE coated coupon was heated at 330° C. for 10 minutes to melt the PTFE to form uniform adherent coatings.

Table 1 presents the coefficient of friction (CoF) values for the lubricious coatings which shows that the lubricious coatings prepared as disclosed herein decreased the coefficient of friction by more than 70% compared to the as-received coupon.

TABLE 1

Coefficient of friction (COF) values for TiCN with various lubricious coatings using granite plate as counter material

| Sample ID | Sample Description | COF |
|---|---|---|
| EXAMPLE A TiCN-AS | As received TiCN coated 422 SS coupon | 0.38 |
| EXAMPLE 1 DCPFTE-MOS | TiCN coated with PFTE intermixed with $MoS_2$ nanoparticles | 0.09 |
| EXAMPLE 2 DCPTFE-GRA | TiCN coated with PFTE intermixed with graphite nanoparticles | 0.10 |
| EXAMPLE 3 DCPTFE-WS2 | TiCN coated with PFTE intermixed with $WS_2$ nanoparticles | 0.03 |

The steel wool wear performance of the lubricious coatings, expressed as the number of cycles to failure (i.e. the number cycles to wear through the thickness of the lubricious coating) are given in Table 2. the lubricious coatings maintained high wear resistance despite the aggressive nature of the steel wool test.

TABLE 2

Steel wool wear performance of TiCN coated with various lubricious coatings

| Sample ID | Sample Description | Abrasive Test Performance (Steel wool) |
|---|---|---|
| EXAMPLE A TiCN-AS | As received TiCN coated 422 SS coupon | Failed after 100 cycles |
| EXAMPLE 1 DCPFTE-MOS | TiCN coated with PFTE intermixed with MoS2 nanoparticles | All three lubricious coated Examples passed 15000 cycles without fail |
| EXAMPLE 2 DCPTFE-GRA | TiCN coated with PFTE intermixed with graphite nanoparticles | |
| EXAMPLE 3 DCPTFE-WS2 | TiCN coated with PFTE intermixed with WS2 nanoparticles | |

Example 4

Figure 3:
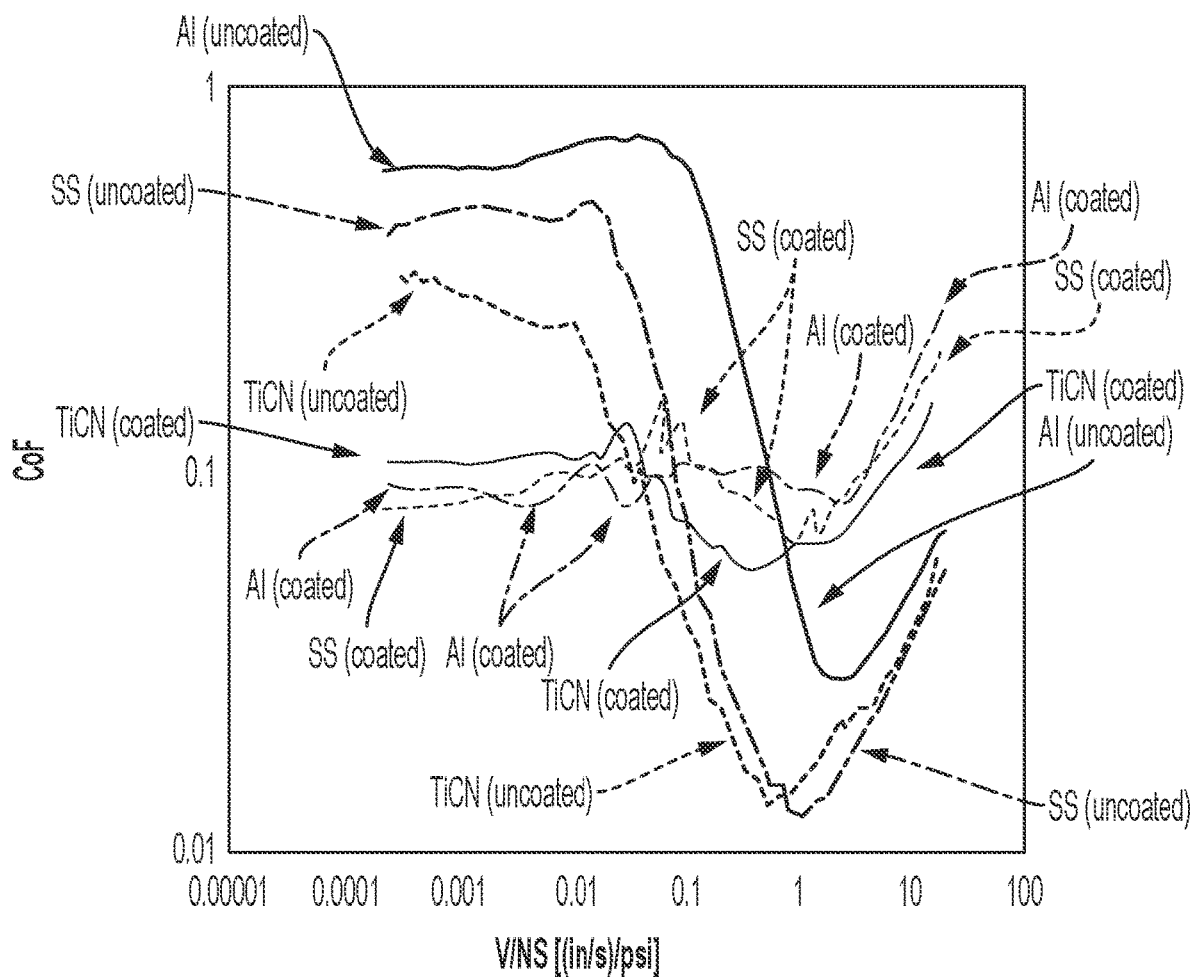
FIG. 3 is a graphical illustration of the effects of a PTFE coating on various substrates (stainless steel, aluminum, TiCN coated stainless steel), with and without a lubricious coating ("coated", "uncoated", respectively) by showing a plot of coefficient of friction (CoF) versus the parameter V/NS in (inches/second)/psi, wherein the coefficient of friction was measured using a shear Rotational rheometer.
Figure 4:
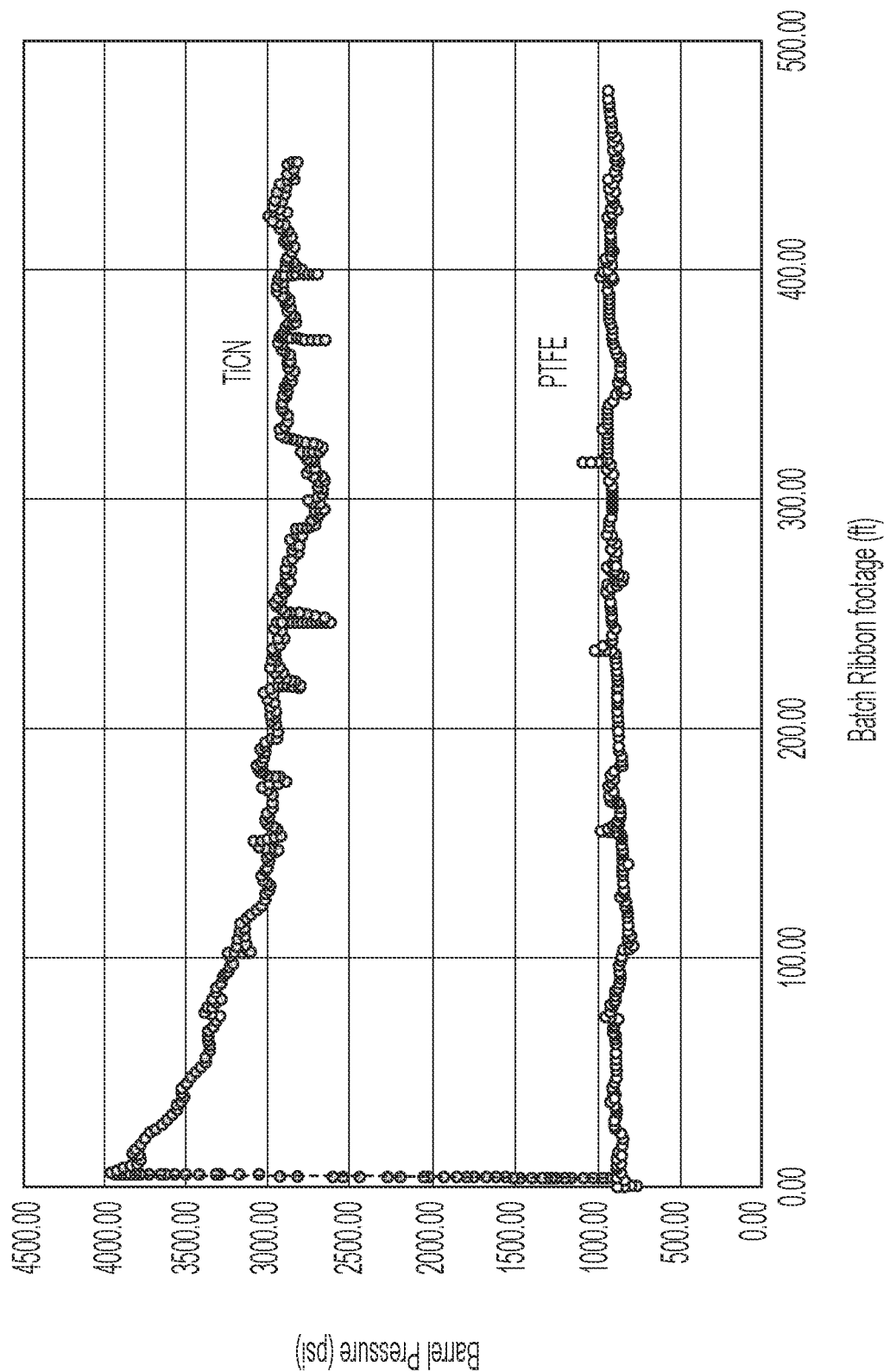
FIG. 4 is a graphical illustration of the extrusion performance of PTFE coated mini-slit die compared to TiCN coated mini-slit die in a mini-slit extrusion run, with the extrusion pressure (extruder barrel pressure) (in psi) plotted against extrudate length (batch ribbon footage) (in feet).
Figure 5:
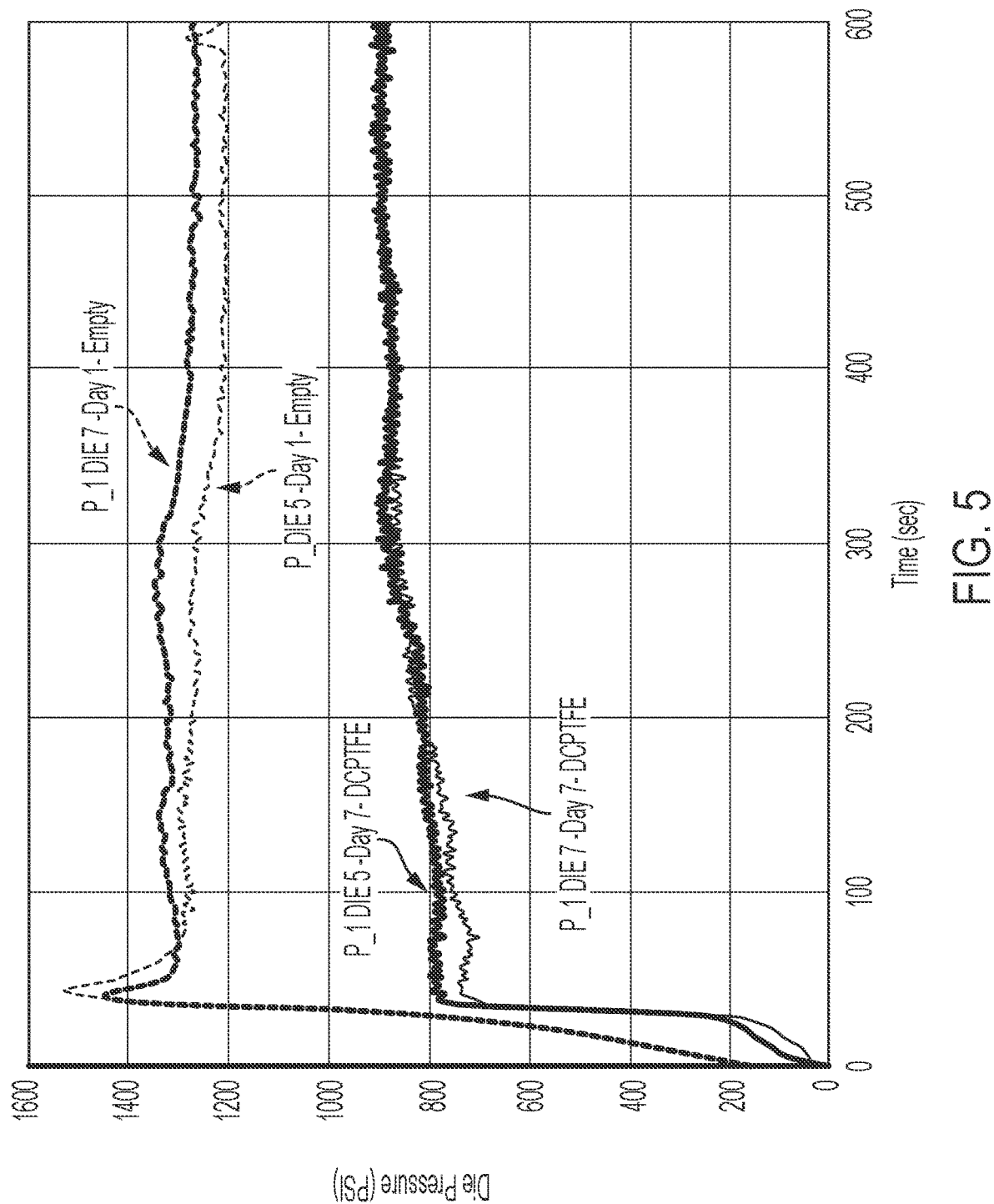
FIG. 5 is a graphical illustration of the startup pressure for a TiCN coated 3.5" diameter 400/4 die (400 cells per square inch, 4 mil honeycomb wall thickness) with and without PTFE coating ("DCPTFE"; "Empty", respectively), with die pressure in psi plotted versus time in seconds.

Lubricious Coating Comprised of PTFE Intermixed $WS_2$ and Silica Nanoparticles In Example 4, the lubricious coating composition of Example 3 was modified by incorporating silica nanoparticles to improve the wear resistance of the lubricious matrix (PTFE). The content of $WS_2$ and silica were respectively 2.0 wt % and 3.3 wt % relative to the amount of PTFE. The coating was applied to discs of different materials and the lubricity of the coating was evaluated using a shear rotational rheometer. FIG. 3 shows the coefficient of friction (CoF) values. The effect of the lubricious coating on die pressure was evaluated using a mini-slit die and a small-scale 3.5" Dia. 400/4 die with extrusion test results shown in FIGS. 4 and 5, respectively. In both tests, the applied lubricious coating led to reduced extrusion pressure.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:
1. An extrusion component for an extrusion apparatus, the extrusion component comprising:
an extrusion body comprising an inlet face and an outlet face, the extrusion body comprising a base structure comprising an internal wall of the extrusion component defining at least a portion of an extrusion pathway from the inlet face to the outlet face, wherein at least part of the internal wall comprises a lubricious coating that defines at least part of the extrusion pathway.

2. The extrusion component of claim 1 wherein the lubricious coating has a surface facing the extrusion pathway with an average coefficient of friction of about 0.01 to 0.40 as measured using a shear rotational rheometer.

3. The extrusion component of claim 1 wherein the lubricious coating has a surface facing the extrusion pathway with an average coefficient of friction of about 0.01 to 0.10 as measured using a shear rotational rheometer.

4. The extrusion component of claim 1 wherein the lubricious coating has a surface facing the extrusion pathway with an average coefficient of friction of about 0.05 to 0.20 for V/NS of 0.0002 to 2 (inch/s)/psi as measured using a shear rotational rheometer.

5. The extrusion component of claim 1 wherein the lubricious coating has a surface facing the extrusion pathway with an average coefficient of friction of less than about 0.30 for V/NS of 0.0001 to 10 (inch/s)/psi as measured using a shear rotational rheometer.

6. The extrusion component of claim 1 wherein the lubricious coating has a surface facing the extrusion pathway with an average water contact angle of about 130° or more.

7. The extrusion component of claim 1 wherein the lubricious coating has a surface facing the extrusion pathway with an average oil contact angle of about 5° or less.

8. The extrusion component of claim 1 wherein the lubricious coating is hydrophobic.

9. The extrusion component of claim 1 wherein the lubricious coating is oleophilic.

10. The extrusion component of claim 1 wherein the lubricious coating is hydrophobic and oleophilic.

11. The extrusion component of claim 1 wherein the lubricious coating comprises a fluoropolymer.

12. The extrusion component of claim 1 wherein the lubricious coating comprises inorganic nanoparticles.

13. The extrusion component of claim 1 wherein the inorganic nanoparticles are present in the lubricious coating in an amount of 0.1 wt % to 10 wt % relative to the amount of fluoropolymer.

14. The extrusion component of claim 1 wherein the lubricious coating comprises inorganic sulfide nanoparticles.

15. The extrusion component of claim 1 wherein the lubricious coating comprises inorganic carbon nanoparticles.

16. The extrusion component of claim 1 wherein the lubricious coating comprises silica nanoparticles.

17. The extrusion component of claim 1 wherein the lubricious coating comprises inorganic silica compound nanoparticles.

18. The extrusion component of claim 1 wherein the lubricious coating comprises nanoparticles selected from the group consisting of $MoS_2$, graphite, graphene, $WS_2$, silica, and combinations thereof.

19. The extrusion component of claim 1 wherein the lubricious coating comprises $WS_2$ nanoparticles and silica nanoparticles.

20. The extrusion component of claim 1 wherein the lubricious coating comprises one or more inorganic compounds selected from the group consisting of sulfides, inorganic carbon compounds, and combinations thereof.

21. The extrusion component of claim 1 wherein the lubricious coating comprises PTFE and nanoparticles of $WS_2$ and silica which are present in the lubricious coating respectively at 2.0 wt % and 3.3 wt % relative to the amount of PTFE.

22. The extrusion component of claim 1 wherein the internal wall comprises an abrasion resistant layer disposed beneath the lubricious coating, wherein the abrasion resistant layer is comprised of one or more compounds selected from the group of iron boride, chromium carbide, aluminum oxide, titanium carbide, titanium nitride, titanium carbonitride (TiCN) and boron doped titanium carbonitride (B-TiCN).

* * * * *